Jan. 9, 1962 L. A. CIOFFI 3,016,162
ANTI-SIPHONING DEVICE
Filed Dec. 19, 1958 2 Sheets-Sheet 1
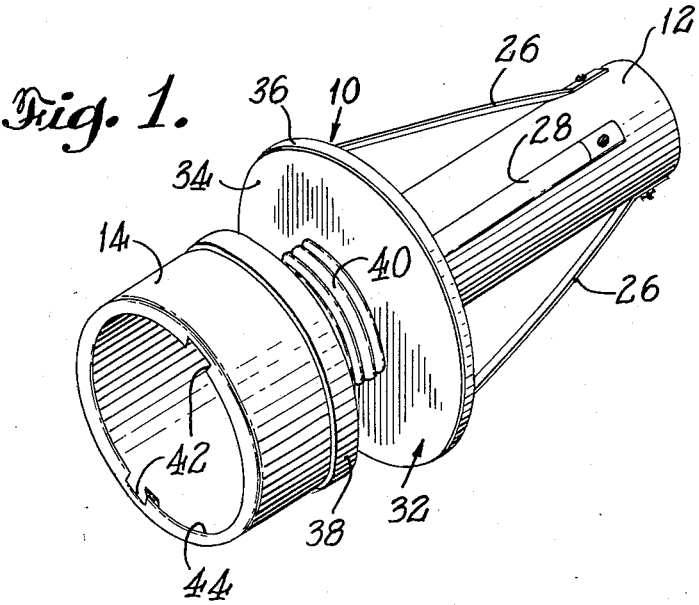
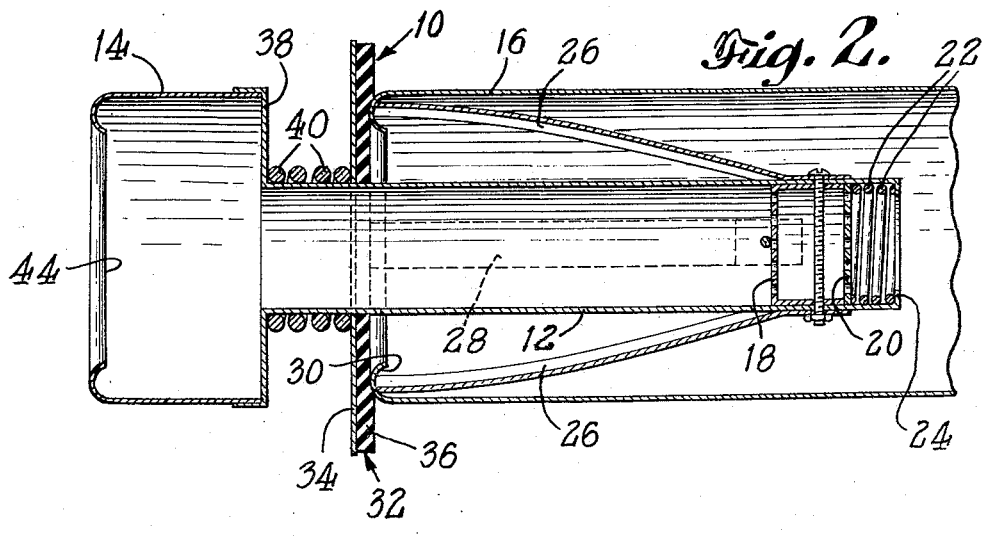
INVENTOR.
LOUIS A. CIOFFI
BY
ATTORNEY Jan. 9, 1962　　　　　L. A. CIOFFI　　　　3,016,162
ANTI-SIPHONING DEVICE Filed Dec. 19, 1958　　　　　　　　　　2 Sheets-Sheet 2

INVENTOR.
LOUIS A. CIOFFI
BY
ATTORNEY

United States Patent Office 3,016,162
Patented Jan. 9, 1962

3,016,162
ANTI-SIPHONING DEVICE
Louis A. Cioffi, 345 E. 119th St., New York, N.Y.
Filed Dec. 19, 1958, Ser. No. 781,660
6 Claims. (Cl. 220—86)

The present invention relates to an improved anti-siphoning device of the type employed in vehicle gas tank filler tubes.

Heretofore, a variety of anti-siphoning devices have been proposed for use with vehicle gas tank filler tubes. Many of these employ an internal grid structure to prevent the insertion of siphoning tubes into the gas tank. Some of these have employed spring means to prevent removal of the device from the filler tube, while many have provided for the joining of the device to the neck of the filler tube by welding or other permanent means. On the other hand, many of the prior anti-siphoning devices, while they provided means normally capable of preventing removal without self-destruction, did not provide for firm engagement of the device to the neck of the filling tube, thereby permitting annoying rattling and slack through which a tool might be inserted to permit release of the device from the filling tube.

It is the prime object of the present invention to provide such an anti-siphoning device which is simple in construction, permits easy mounting in the filling tube by an unskilled vehicle owner, presents firm engagement with the neck of the filling tube to eliminate rattling, and prevents the passage of siphoning means therethrough without destruction of the device.

Other aims and advantages of the invention will be apparent from the following description and appended claims.

In accordance with the present invention, an anti-siphoning device is provided which comprises a sleeve member for partial insertion into a gas tank filling tube, grid means mounted internally of the sleeve member in the insertable portion thereof, a plurality of flat spring means mounted at their ends externally of the sleeve member and axially arranged in at least two opposed pairs around the exterior thereof, the upper ends of the flat spring means being adapted to engage the lip of the filling tube, and retaining plate means mounted on the non-insertable portion of the sleeve member and provided with associated means for holding the device firmly in the filling tube by exerting engaging force between the flat spring means and the lip of the filling tube.

In the drawings:

FIG. 1 is a perspective view of an anti-siphoning device embodying the invention and capable of use with a vehicle gas tank filling tube having an inwardly-extending lip;

FIG. 2 is a cross-sectional view of the antisiphoning device of FIG. 1; and

Figure 3:
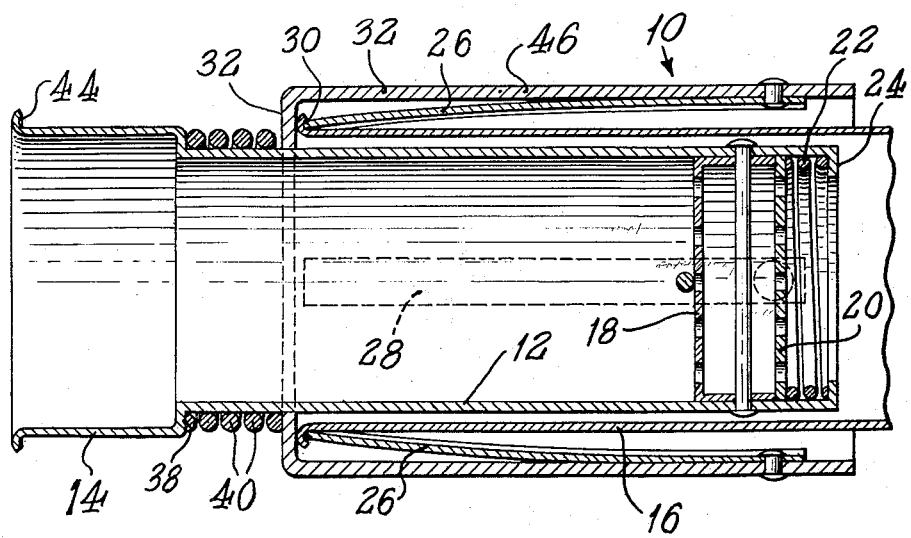
FIG. 3 is a cross-sectional view of a modified anti-siphoning device embodying the invention and capable of use with a vehicle gas tank filling tube having an outwardly-extending lip.

Referring specifically to the embodiment of FIGS. 1 and 2, an anti-siphoning device 10 is provided having cylindrical sleeve member 12, and a filler cap receiving fixture 14 secured to one end thereof and having the same dimensions as those of the gas tank filling tube 16 in which the device 10 is to be inserted. Grid means 18 and 20 are mounted internally of the sleeve member 12, the former in a fixed position and the latter against helical spring 22 which abuts against the flange 24 at the lower end of sleeve member 12.

Two pairs of opposed flat springs 26 and 28 are mounted axially around the outer surface of sleeve member 12. These flat springs tend to project outwardly from the surface of the sleeve member and are engaged in the lip 30 of the gas tank filling tube 16.

A retaining plate means 32, comprising a metal plate 34 slidably mounted on sleeve member 12 and a rubber washer 36 secured to the under side thereof, is spring-loaded against the base 38 of filler cap receiving fixture 14 by means of helical spring 40, or other equivalent force-producing means. The spring loading of retaining plate means 32 exerts an axial engaging force between the ends of flat springs 26 and 28 and the lip 30 of the gas tank filling tube 16, thereby preventing rattling of the anti-siphoning device in the filling tube.

To properly mount the anti-siphoning device 10 in the gas tank filling tube 16, the sleeve member 12 is first inserted into the filling tube. The device is then rotated until one pair of opposed flat springs 26 is engaged in the lip 30 of the filling tube 16 by passage through opposed slots which are provided in the lip 30 in positions corresponding to those of slots 42 provided in the lip 44 of filler cap receiving fixture 14. The device is then again rotated until the other pairs of flat springs 28 engage the lip 30 by passage through the slots therein. During this rotation the device must be forced into the filling tube against the action of retaining spring 40. Upon the engagement of all the flat springs with the lip of the filling tube, the device may be released and will be then firmly engaged in the filling tube.

The provision of fixed grid means 18 will normally prevent siphoning of the gas tank through the device. However, should an object be driven through this fixed grid, the provision of spring-loaded grid 20 below will afford great resistance to such penetration as is required to permit the passage of siphoning means through the device to the gas tank. Thus, while the anti-siphoning device of the invention provides security against siphoning by the penetration of the internal grid structure, it offers no resistance to the passage of gas therethrough to the gas tank.

Once the device is engaged in the filling tube of the gas tank it is not capable of removal without destruction of the device and/or the filling tube. In the case of most acts of attempted siphoning this factor will be a sufficient deterrent since the person attempting the act is usually either an employee of the owner of the vehicle or it is not willing to assume the difficulty or take the time required to destroy the device to effect its removal.

While the vast majority of vehicle gas tank filling tubes have inwardly-extending lips, some vehicles (such as the 1955 Chevrolet) have outwardly-extending filling tube lips. The anti-siphoning device of FIG. 3 of the drawings is capable of use with such filling tubes having outwardly-extending lips. The elements of FIG. 3 have been assigned numbers identical with equivalent elements of the embodiment of FIGS. 1 and 2.

Referring specifically to FIG. 3, it may be seen that the spring-loaded retaining plate means 32 is provided with a cylindrical skirt 46 which has an inside diameter slightly greater than that of the lip 30 of the filling tube 16 and a length substantially equal to that of the insertable portion of the sleeve member 12. In this modified embodiment, the plurality of flat springs 26 and 28 are mounted axially around the inner surface of cylindrical skirt member 46 and protrude in an inward direction so as to engage the outwardly-extending lip 30 of the filling tube. In all other respects this modification of the invention is substantially identical to the embodiment of FIGS. 1 and 2.

It has been found that, for all embodiments, increased strength and resistance to tampering is provided when the diameter of the cylindrical sleeve member is as large as possible thereby reducing play between the sleeve member and the filling tube.

What is claimed is:

1. An anti-siphoning device capable of use with a vehicle gas tank filling tube having an inwardly-extending lip which comprises a generally cylindrical sleeve member for partial insertion into said filling tube; grid means mounted within said sleeve member in the insertable portion thereof; a plurality of flat spring means mounted at their lower ends on the outer surface of said sleeve member and axially arranged in at least two opposed pairs, the upper ends of said flat spring means being adapted to engage the lip of said filling tube; retaining plate means slidably mounted on the sleeve member between the non-insertable portion thereof and the upper ends of said flat spring means; and compression spring means between the non-insertable portion of said sleeve member and said retaining plate means adapted resiliently to engage the latter with the end of said filling tube holding said device firmly in said filling tube by exerting engaging force between said flat spring means and said lip of said filling tube.

2. The anti-siphoning device in accordance with claim 1, wherein said grid means includes an internal grid spring mounted to permit motion of said grid means in the direction further into said filling tube.

3. The anti-siphoning device in accordance with claim 1, wherein the non-insertable portion of said sleeve member is provided with a filler cap receiving fixture having the same shape and dimensions as the filler cap receiving portion of the gas tank filling tube in which said device is inserted, thereby permitting closure of the gas tank through the device by use of the original tank closure cap.

4. An anti-siphoning device capable of use with a vehicle gas tank filling tube having an outwardly-extending lip which comprises a generally cylindrical sleeve member for partial insertion into said filling tube; grid means mounted within said sleeve member in the insertable portion thereof; spring-loaded retaining plate means mounted in the non-insertable portion of said sleeve member for holding said device firmly in said filling tube, said plate means having a cylindrical skirt extending therefrom with an internal diameter greater than that of said lip of said filling tube; and a plurality of flat spring means mounted at their lower ends on the inner surface of said cylindrical skirt and axially arranged in at least two opposed pairs, the upper ends of said flat spring means being adapted to engage the lip of said filling tube and there held in engagement by the spring loading of said retaining plate means.

5. The anti-siphoning device in accordance with claim 4, wherein said grid means includes an internal grid spring mounted to permit motion of said grid means in the direction further into said filling tube.

6. The anti-siphoning device in accordance with claim 4, wherein the non-insertable portion of said sleeve member is provided with a filler cap receiving fixture having the same shape and dimensions as the filler cap receiving portion of the gas tank filling tube in which said device is inserted, thereby permitting closure of the gas tank through the device by use of the original tank closure cap.

References Cited in the file of this patent

UNITED STATES PATENTS

| | | |
|---|---|---|
| 823,287 | Meyer | June 12, 1906 |
| 1,574,500 | Marte | Feb. 23, 1926 |
| 1,971,714 | Harkness | Aug. 28, 1934 |
| 1,994,421 | Roberts | Mar. 12, 1935 |
| 2,017,837 | Anschicks | Oct. 22, 1935 |
| 2,107,600 | Darms | Feb. 8, 1938 |
| 2,284,107 | Sullivan | May 26, 1942 |
| 2,421,350 | Odell | May 27, 1947 |
| 2,570,550 | Hanson | Oct. 9, 1951 |

FOREIGN PATENTS

| | | |
|---|---|---|
| 323,287 | Italy | Dec. 15, 1934 |
| 555,243 | Great Britain | Aug. 12, 1943 |